United States Patent [19]
Hoelscher

[11] Patent Number: 6,145,609
[45] Date of Patent: Nov. 14, 2000

[54] TRACK VEHICLE PIVOT SYSTEM

[75] Inventor: Kurtis Rex Hoelscher, 7219 Harris Rd., Celina, Ohio 45822

[73] Assignee: Kurtis Rex Hoelscher, Celina, Ohio

[21] Appl. No.: 09/317,747

[22] Filed: May 24, 1999

Related U.S. Application Data

[60] Provisional application No. 60/087,781, Jun. 1, 1998.
[51] Int. Cl.[7] .................................................. B62D 55/00
[52] U.S. Cl. ........................ 180/9.44; 180/9.1; 180/9.52; 280/758
[58] Field of Search ................................. 180/9.46, 9.52, 180/9.44, 9.38, 9, 9.1, 193, 403, 6.48, 6.54; 280/758, 755

[56] References Cited

U.S. PATENT DOCUMENTS

| | | | |
|---|---|---|---|
| 4,230,199 | 10/1980 | Stedman | 180/9.2 |
| 4,325,443 | 4/1982 | Fischer et al. | 180/6.54 |

FOREIGN PATENT DOCUMENTS

| | | | |
|---|---|---|---|
| 0109781 | 4/1990 | Japan | 180/9.52 |
| 405170147 | 7/1993 | Japan | 180/9.52 |
| 405085428 | 4/1994 | Japan | 180/9.1 |
| 406099843 | 4/1994 | Japan | 180/9.52 |
| 002000235 | 9/1993 | Russian Federation | 180/9.1 |

*Primary Examiner*—Brian L. Johnson
*Assistant Examiner*—G B Klebe
*Attorney, Agent, or Firm*—George H. Morgan, P.E.

[57] ABSTRACT

The present invention comprises at least one cylinder, such as a hydraulic cylinder connected between a vehicle or machine upper structure frame and a dual track undercarriage which is used to shift the weight of a tracked vehicle so that the vehicle or machine turns easier, suffers less componentry wear, and inflicts less damage on a surface under the tracked vhiicle or machine. A simple electronic control can be used to permit an operator to indicate the desired direction of turn, which then actuates a sensor which signals an electric solonoid operated hydraulic valve which then directs hydraulic fluid to the cylinder which shifts the weight as required for the direction of turn.

4 Claims, 6 Drawing Sheets

6,145,609

1

TRACK VEHICLE PIVOT SYSTEM

CROSS REFERENCES TO RELATED APPLICATIONS

Applicant claims priority pursuent to 35 U.S.C. Par. 119(e)(i) of Provisional Application for Patent No. 60/087,781 of Jun. 1, 1998 with the same title: Track Vehicle Pivot System.

Statement as to Rights to inventions made under Federally sponsored research and development: Not applicable.

BACKGROUND OF THE INVENTION

1. Field of the Invention

The present invention relates to an improved way of turning, or pivoting, tracked vehicles and machinery. This is of interest to, but not restricted to, track drive construction equipment, especially track driven trenching, ditching and excavating machinery.

2. Background Information

Vehicles and machines that use tracks instead of wheels, are popular for operating off-highway and cross country. Such equipment is often involved in construction activities. Such equipment includes, but is not restricted to ditching, trenching, and excavating equipment. Tracks are especially useful on terrain that is not a road surface. Tracks permit the distribution of a vehicle or machine weight across a broader surface area of the ground as opposed to wheels. This has advantages. For example, less compaction damage occurs to the soil. This is especially important to farmers. Also, a tracked vehicle is more able to negotiate rough terrain than is a wheeled vehicle. In ditching and trenching operations on agricultural land, a problem in existing tracked machinery is that ground damage occurs as existing tracked vehicles are negotiating turns. The tracks scour the earth, inflicting the ground damage. This is undesirable, but no one seems to have found a practical answer to date. Also, the friction between tracks and ground during turning or pivoting of tracked vehicles or machines imposes wear and tear on undercarriage componentry, including the tracks, of the tracked vehicles or machinery. Also, more horsepower is required for turns and pivots, which increases noise and burns more fuel, increasing atmospheric pollution levels.

As will be seen in the subsequent description, these and other shortcomings of the prior art are overcome by the preferred embodiments of the present invention.

SUMMARY OF THE INVENTION

The present invention, a tracked vehicle pivot system, enables a vehicle or machine with a tracked undercarriage comprising dual tracks, to execute shorter turns with less componentry wear and less ground damage. The tracked vehicle pivot system comprises a means of shifting weight distribution of an upper structure of said vehicle or machine on said tracked undercarriage dual tracks. In the preferred embodiment of the present invention said means is a cylinder, such as a hydraulic cylinder, connected between the upper structure of a tracked vehicle or machine frame and a track strut which is used to shift the weight distribution of the upper structure of the tracked vehicle on the tracks so that the vehicle or machine turns easier suffering less componentry wear and inflicts less damage on a surface under the tracks. A simple electronic control can be used to permit an operator to indicate the desired direction of turn, which then actuates a sensor which signals an electric solenoid operated hydraulic valve which then directs hydraulic fluid from a hydraulic pump to the cylinder which shifts the weight distribution of the upper structure on the tracks as required for the direction of turn.

On actuation of said means of shifting weight distribution to facilitate a turn, the weight distribution is shifted towards the rear of the track of the undercarriage on the proximate side of the turn and also towards the front of the track of the undercarriage on the distal side of the turn, thereby enabling a pivoting action of said machine while turning.

DESCRIPTION OF THE PREFERRED EMBODIMENTS

Figure 1:
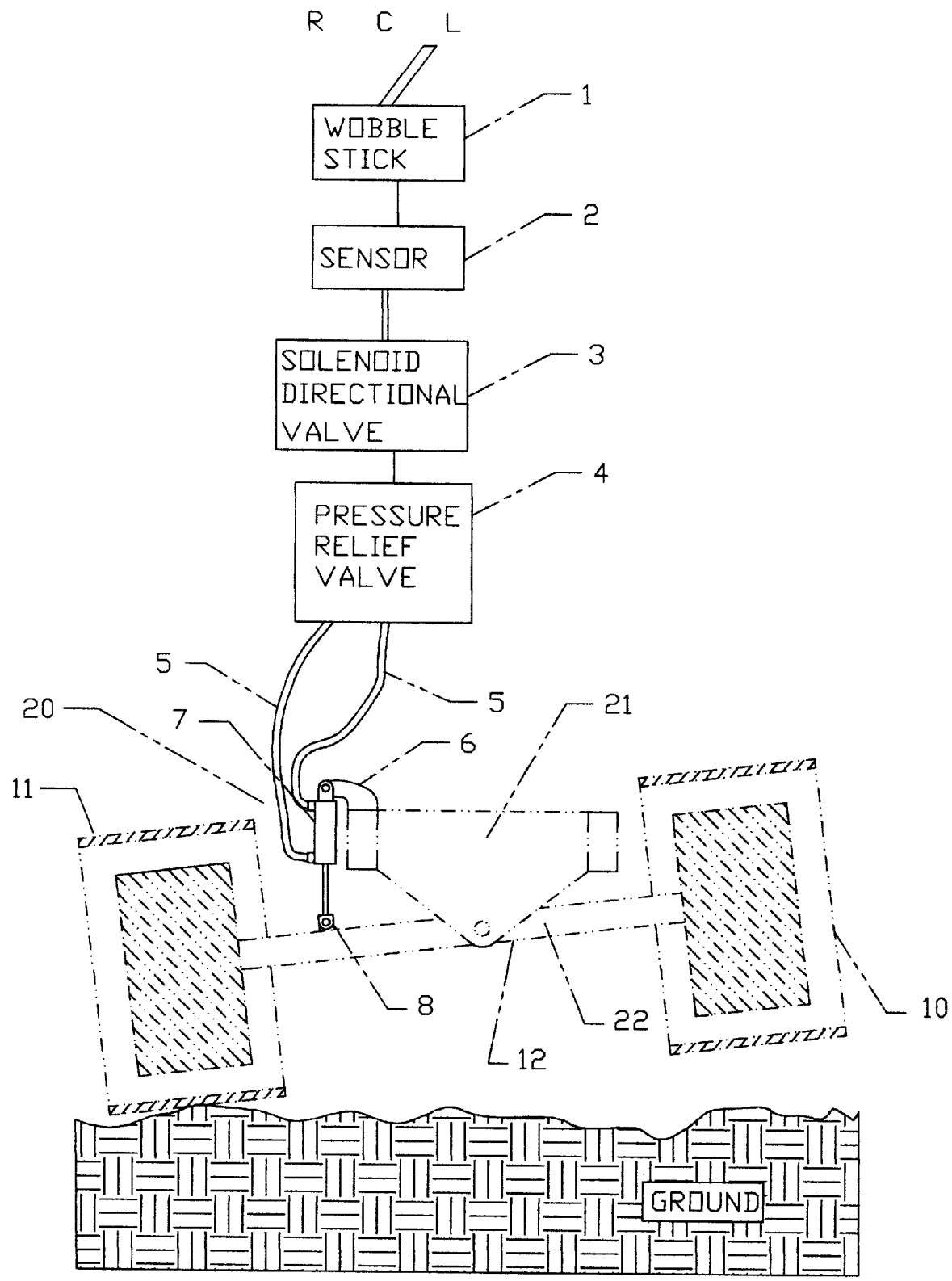
FIG. 1 represents the front end of a tracked self-propelled machine in a left hand turn mode.

FIG. 1 represents the present invention, a tracked vehicle pivot system, 20 installed between an upper frame 21 and a dual track undercarriage 22 of a tracked vehicle or machine. The tracked vehicle pivot system 20 comprises a hydraulic cylinder 7 attached to an ear 6 affixed to the upper frame 21 and to a bracket 8 affixed to a track strut 12 of the dual track undercarriage 22 plus appropriate hydraulic controls and valving to actuate the hydraulic cylinder 7 as required. The dual track undercarriage 22 comprises two tracks, a left track 10 and a right track 11.

In the preferred embodiment of the present invention, the cylinder 7 is a double acting hydraulic cylinder mounted so it pivots at both ends. As obvious to anyone skilled in the art, two single acting cylinders could be used, in an alternate embodiment.

In the preferred embodiment of the present invention, a wobble stick 1 is actuated by an operator, a sensor 2 picks up on the direction of turn indicated by the operator transmitting a signal which actuates the solenoid directional valve 3, which actiates thie cylinder 7. A pressure relief valve 4 would nsually be included somewhere in the system. the wabble sticks 1 can be an electroiic joy stick assembly with integral steer switches or a rockar switch on the handle. Such wobble sticks 1 are common to the trade. Block diagrams, Properly labeled to represent various above named componentry are used in FIGS. 1, 2, and 3. The wobble stick 1 positions are labeled R for right, L for left, and C for center.

Figure 6:
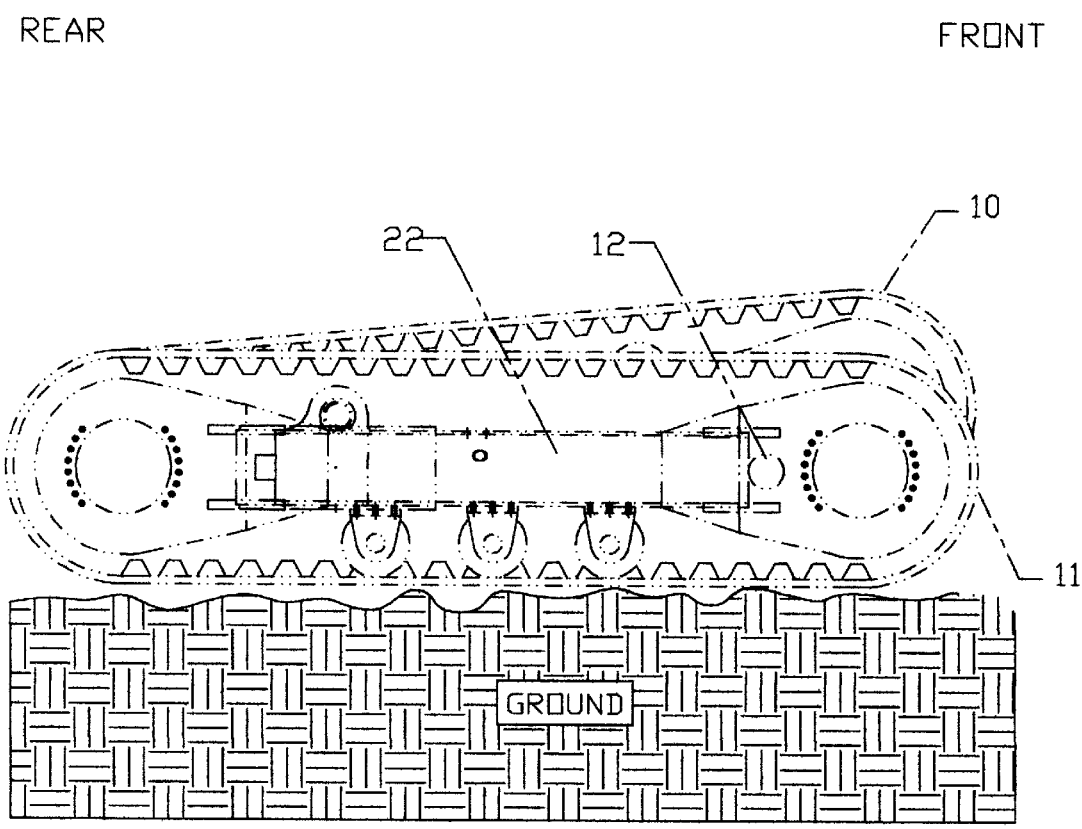
FIG. 6 represents a side view of the tracked undercarriage assembly in a left hand turn mode.

FIG. 1 represents a front end of a self-propelled tracked machine while making a left hand turn. The left hand is meant to the left of an operator as he sits in a vehicle. FIG. 6 also represents the undercarriage 22 while making the left hand turn. When the cylinder 7 is extended, under hydraulic pressure, the weight distribution of the upper frame 21 on the undercarriage 22 is skewed, forcing more weight on the front of the right track 11, which results in less weight on the front of the left track 10. This also throws more weight on the rear of the left track 10. As a result, the rear end of the left track 10 acts as a pivot point and the undercarriage assembly 22 executes a left hand turn with a minimum of ground scuffing as well as incurring less wear and tear. The upper frame 21 represents the upper structure of the self-propelled tracked machine.

Figure 2:
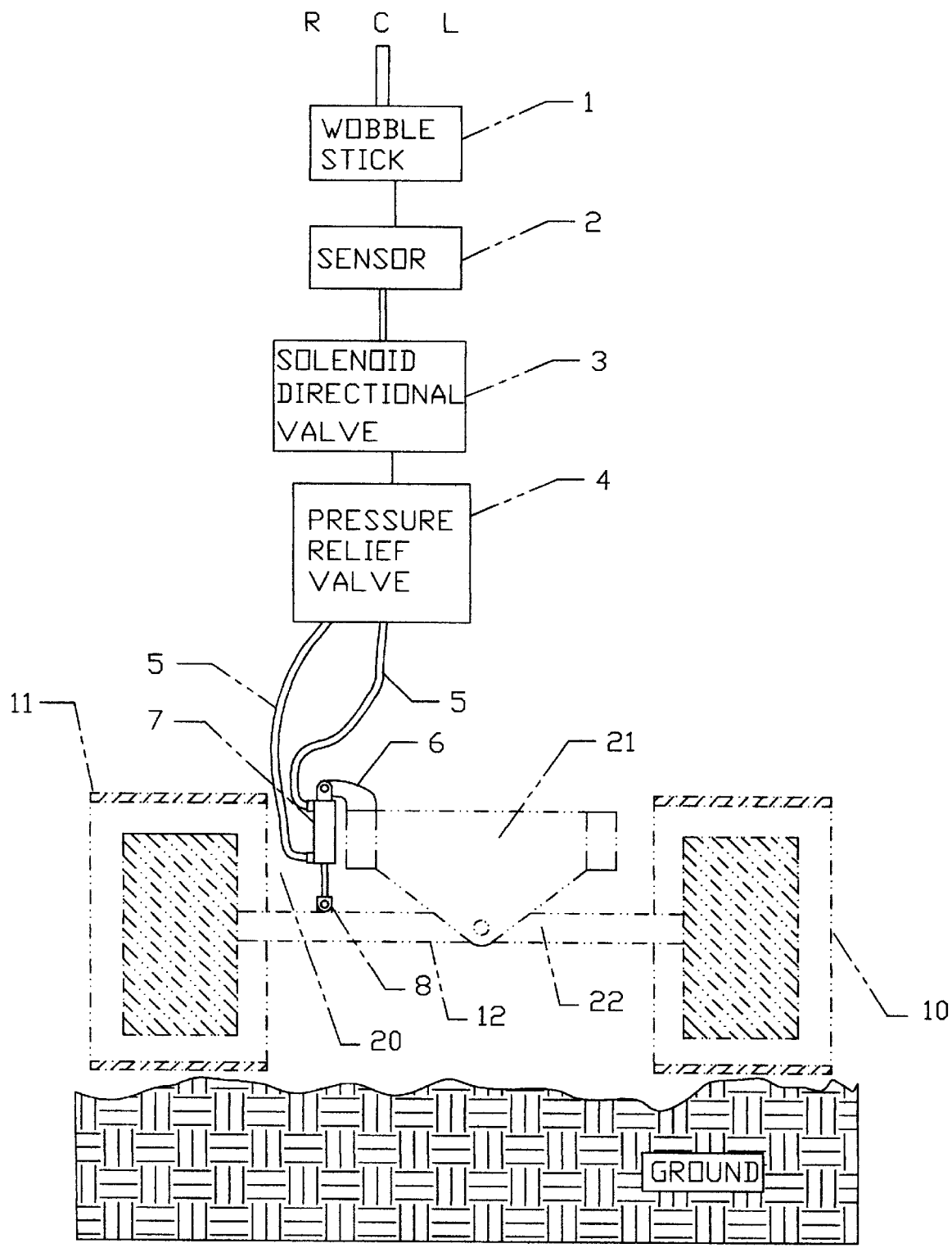
FIG. 2 represents the front end of the tracked self-propelled machine in a non-turning mode.
Figure 5:
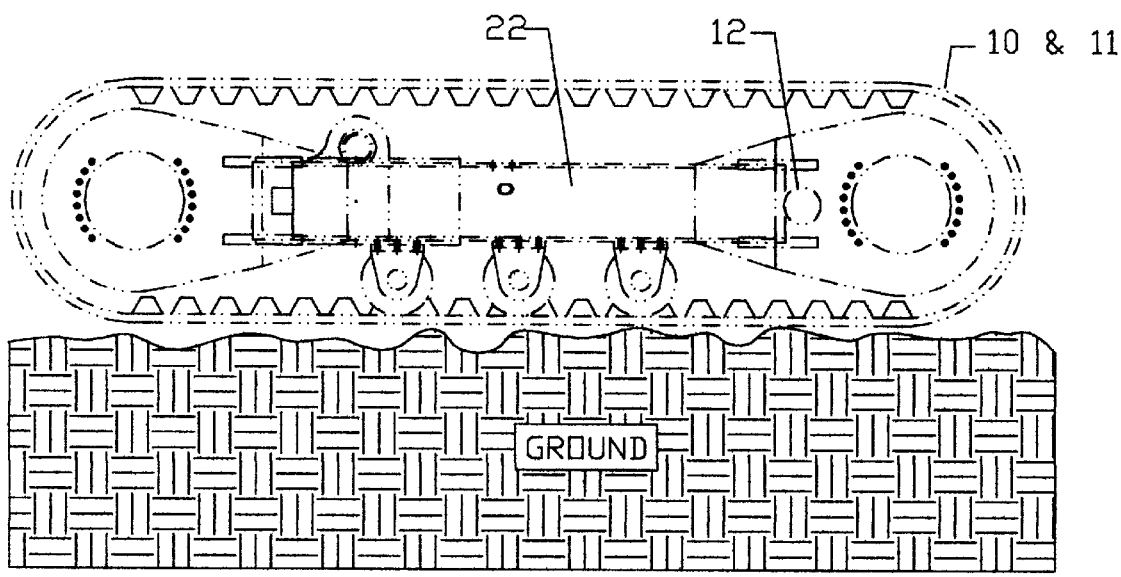
FIG. 5 represents a side view of the tracked undercarriage assembly in a non-turning mode.

FIGS. 2 and 5 represent a front view of the undercarriage 22 of a self-propelled tracked machine in a non turning mode.

Figure 3:
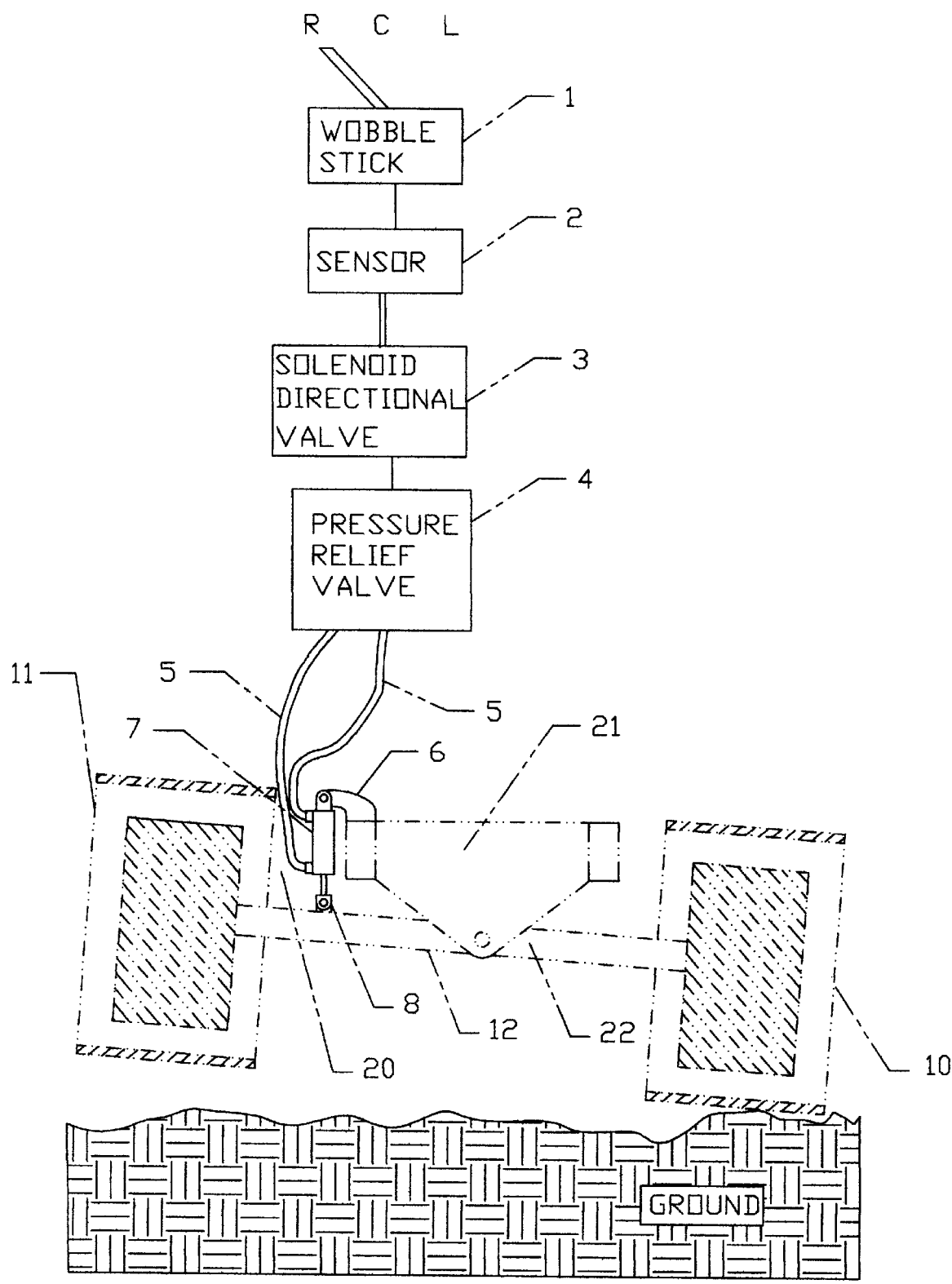
FIG. 3 represents the front end of the tracked self-propelled machine in a right hand turn mode.
Figure 4:
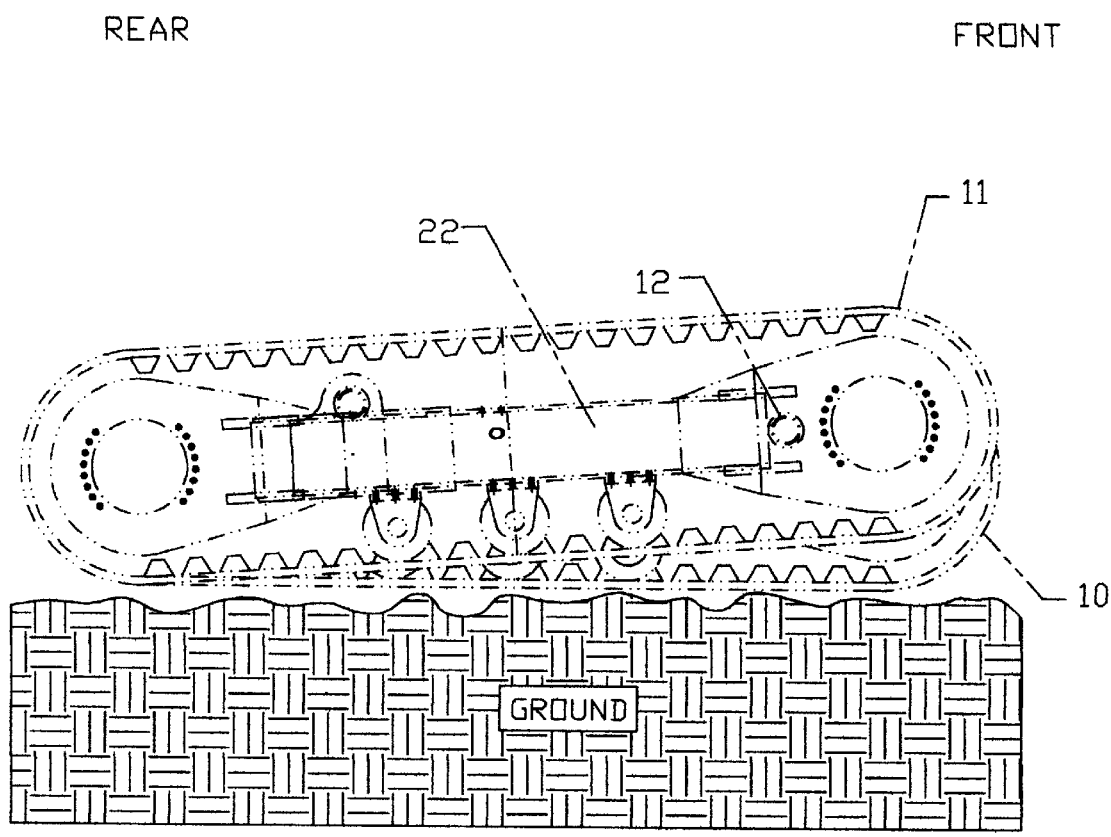
FIG. 4 represents a side view of a tracked undercarriage assembly in a right hand turn mode.

FIGS. 3 and 4 represent a front view of the undercarriage 22 in a right hand turn mode. When the cylinder 7 is retracted, the cylinder is pulling upwards on the front of the right track 11. This forces more weight back on the rear of the right track 11. This also results in more weight on the front of the left track 10 and less on the rear of the left track 10. As a result, the rear of the right track 11 acts as a pivot point and the undercarriage assembly 22 executes a right hand turn with a minimum of ground scuffing as well as incurring less wear and tear.

With this invention, the turns are easier and noticeably quieter, consuming less horsepower which means less fuel consumption which in turn means less pollution of the atmosphere.

When no turn is being made the wobble stick 1 remains in the centered position (Ref. FIGS. 2 and 5). When the wobble stick 1 is in the centered position no signal is being sent to the sensor 2 so the left track 10 and the right track 11 are allowed to freely float up and down to adjust to the terrain. This is normal mode of operation for machines and vehicle with tracked undercarriages.

The cylinder 7 serves as a means of shifting weight distribution of an upper structure of a vehicle or machine on the dual tracks, which are the left track 10 and the right track 11, of a dual track undercarraige 22. Upon the actuation of said means of shifting weight distribution of an upper structure of a vehicle or machine on said tracks 10 and 11 to facilitate a turn, the weight distribution of an upper structure is shifted towards the rear of the track of the undercarriage on the proximate side of the turn and also towards the front of the track of the undercarriage oil the distal side of the turn, thereby enabling a pivoting action of said vehicle or machine while turning.

In the preferred embodiment of the present invention, the structural parts typically are of metal, such as steel or aluminum.

Although the description above contains many specificities, these should not be construed as limiting the scope of the invention but as merely providing illustrations of some of the presently preferred embodiments of this invention. For example, while the description of the preferred embodiments of the present invention is directed to one double acting hydraulic cylinder and one electric solenoid operated four-way hydraulic directional valve to operate said cylinder, as obvious to anyone skilled in the art, two single acting hydraulic cylinders along with two three way electric solenoid valves accomplish the same end. With the popularity of manifold valving on construction equipment, often four-way spool valves are replaced with multiple two-way modular componentry hydraulic valves such as are common to the trade.

For electric driven equipment, the cylinder could be replaced with an electrically actuated operator.

This invention is especially applicable to ditch digging, excavating, and trenching machines. However, it has applications on many other machines with tracked drive undercarriages.

Thus the scope of the invention should be determined by the appended claims and their legal equivalents rather than by the examples given.

I claim:

1. A tracked pivot system, for vehicles and machines with a dual track undercarriage and a frame, comprising:

a means of shifting weight distribution of a vehicle or machine on said dual track undercarraige, wherein said means is connected between the dual track undercarriage and the frame so that upon actuation of said means of shifting weight distribution to facilitate a turn, the weight distribution is shifted towards the rear of the track of the dual track undercarriage on the proximate side of turn, and also towards the front of the track of the dual track undercarriage on the distal side of the turn, thereby enabling a pivoting turn action of said vehicle or machine.

2. The tracked pivot system of claim 1 wherein the means of shifting the weight distribution of a vehicle or machine on said dual track undercarriage and the frame is at least one hydraulic cylinder.

3. The tracked pivot system of claim 2 further comprising:

a) a wobble stick, b) a sensor, and c) a solonoid directional valve, wherein upon actuation of the wobble stick by an operator, the sensor senses the position of the wobble stick and transmits a signal to the directional valve which directs fluid from a pump to said hydraulic cylinder which shifts weight distribution as directed by solonoid directional valve.

4. The tracked pivot system of claim 3 further comprising a pressure relief valve.

\* \* \* \* \*